Patented July 4, 1939

2,164,785

UNITED STATES PATENT OFFICE 2,164,785

AZO DYES

Swanie Siguard Rossander, Wilmington, Del., assignor to E. I. du Pont de Nemours & Company, Wilmington, Del., a corporation of Delaware No Drawing. Application November 20, 1937, Serial No. 175,640

19 Claims. (Cl. 8—46)

This invention relates to azo dyes. More particularly this invention deals with a novel series of polyazo dyes which are characterized by the general formula $R_1$—N=N—R—CONH—Alk—NHCO—R—N
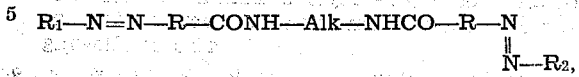
‖
N—$R_2$, wherein Alk designates the bivalent residue of a saturated hydrocarbon, for instance the residue of a paraffin or cycloparaffin hydrocarbon; R is a divalent aryl radical of the benzene series, for instance benzene or its alkyl, alkoxy or halogen derivatives; while $R_1$ and $R_2$ are any azo dye coupling components whatsoever, which may or may not contain further azo groups. Depending on whether $R_1$ and $R_2$ do not contain or do contain further azo bridges, the novel dyes of my invention are disazo, trisazo or tetrakisazo compounds. The —N=N— groups must be meta or para to the CONH groups on the divalent aryl radicals, R.

It is an object of my invention to provide new azo dyes which are useful for dyeing vegetable, animal or synthetic fibers. It is a further object of my invention to provide new azo dyes which utilize as initial materials the novel diamino intermediates of copending application Serial No. 161,039, filed by myself and Carlton W. Croco, on August 26, 1937. These intermediates are characterized by the general formula $H_2N$—R—CONH—Alk—NHCO—R—$NH_2$, wherein R is a phenylene radical which may be substituted by alkyl, alkoxy or halogen groups, while Alk is a paraffin hydrocarbon having from 2 to 18 carbon atoms in its structure or a cycloparaffin hydrocarbon. Other useful objects of this invention will appear as the description proceeds.

I have found that azo dyestuffs of the above general formula are characterized by dyeing fiber by the direct method in bright, commercially desirable shades of color, and the dyeings generally possess good fastness qualities. The exact shade depends on the choice of component. Furthermore, by proper choice of component dyes may be produced which have affinity for cotton and regenerated cellulose, wool or silk, or cellulose ester or ether materials.

The mode of procedure in preparing the novel dyestuffs of my invention, generally comprises tetrazotizing a diaminodiaroyl-alkane compound of the general formula

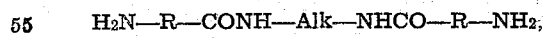
$H_2N$—R—CONH—Alk—NHCO—R—$NH_2$, wherein R and Alk have the same significance as above, and coupling to two moles of a suitable coupling component, depending on what type of fiber the color is desired for, or on the shade desired. This choice of component per se follows well established rules, which are known in the art. For instance, if a dye for cellulose acetate material is desired, a coupling component free of water solubilizing groups is selected; for instance, cresidine, m-toluidine, or 1-phenyl-3-methyl-5-pyrazolone. If a dye for cotton is desired, a component having water-solubilizing groups, namely sulfo or carboxy, is selected, for instance, J-acid or m-amino-phenyl-pyrazolone-carboxylic acid.

If the coupling component contains amino groups, the dyestuff may be further developed on the fiber, by tetrazotizing and coupling to a suitable developer, such as beta-naphthol, phenylmethyl-pyrazolone, or meta-tolylene diamine. This type of coupling component and procedure is particularly desirable in the cases of dyes designed for use on vegetable fiber.

The tetrazotized intermediate aforementioned may also be coupled in two steps using different components in each step (1 mole of each), thereby producing an unsymmetrical disazo compound. If in this case one of the components chosen is itself an azo compound, the resulting dyestuff will be a trisazo compound. But the tetrazotized intermediate may also be coupled in one step to two moles of an azo compound, thereby producing a tetrakisazo dye in substance.

The actual details of procedure may follow in each case the normal procedure preferred with each particular coupling component, as is well known to those skilled in the art.

The preparation of the novel diamino compounds which serve as initial materials for my invention is described in copending application, Serial No. 161,039, filed by myself and Carlton W. Croco, on August 26, 1937. Generally speaking, a nitrobenzoyl chloride, such as nitro-benzoyl chloride itself or an alkoxy, alkyl or halogen derivative thereof, is condensed with a diamine of a saturated hydrocarbon of the general formula $H_2N$—Alk—$NH_2$, wherein Alk stands for the bivalent residue of a paraffin hydrocarbon having from 2 to 18 carbon atoms in its structure, or for the residue of a cycloparaffin, such as cyclohexane or a homolog thereof. The condensation is generally effected in aqueous medium, in the presence of acid absorbing agents, and results in a dinitro compound of the general formula

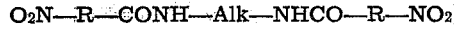
$O_2N$—R—CONH—Alk—NHCO—R—$NO_2$, wherein R and Alk have the same significance as above. The NO₂ groups must be meta or para to the CONH groups on the divalent radicals, R. By reduction in the usual manner, for instance catalytic hydrogenation, the desired diamino compounds are obtained.

As typical compounds of the above type, which may serve as initial materials for my present invention, the following diamino compounds may be mentioned:

N,N'-di (p-aminobenzoyl) -1,2-ethylene-diamine;
N,N'-di(m - aminobenzoyl) - 1,10 - decylene - diamine;
N,N'-di (p-aminobenzoyl) -1,4-diamino-cyclohexane;
N,N'-di(m-aminobenzoyl) -1,6-hexylene-diamine;
N,N'-di(4-methoxy-3-aminobenzoyl) - 1,2 -ethylenediamine;

and similar compounds wherein the benzene rings carry inert substituents such as methyl, ethyl, methoxy, ethoxy, chloro or bromo.

Without limiting my invention to any particular procedure, the following examples, in which parts by weight are given, will serve to illustrate my preferred mode of operation.

Example I

A tetrazo solution is prepared as follows: Slurry 14.9 parts of di(p-aminobenzoyl)-ethylene-diamine with 400 parts of water. Add 25 parts of 32% aqueous hydrochloric acid. Stir until all is dissolved, and cool to 10° C. Add 6.9 parts of 100% sodium nitrite, as a 30% solution, as rapidly as absorbed. Keep a very slight excess of nitrite for 20 minutes at 10 to 12° C.

Stir 39.5 parts of p-aminobenzoyl-J-acid into 600 parts of water. Slowly add just enough ammonium hydroxide to dissolve the P-amino benzoyl-J-acid (approximately 9 parts of 27%), leaving the solution slightly alkaline to brilliant yellow paper. Add 34 parts of soda ash, stir until dissolved (approximately 10 minutes) and cool to 10° C. by the addition of ice. Slowly add the tetrazo solution prepared above to the p-aminobenzoyl-J-acid solution, maintaining good agitation. Stir 3 hours allowing the mass to gradually come to room temperature, maintaining an alkalinity which will give a strong red coloration on brilliant yellow paper, and an excess of p-aminobenzoyl-J-acid. Slowly warm the mass to 75° C. and add approximately 180 parts (10% by volume) of salt. Stir 20 minutes. Filter the coupling mass, and dry the press cake in an oven at 80 to 90° C. When powdered the dry product is reddish orange in appearance. It dissolves in water to give an orange solution.

Its probable structural formula is:

The disazo compound thus produced dyes cotton by the direct method in orange shades. When developed on the fiber by tetrazotization and coupling to beta-naphthol, it produces a bright orange dyeing of outstanding fastness to washing.

Example II

Tetrazotize 14.9 parts of di-(p-aminobenzoyl)-ethylene-diamine following the directions given in Example I.

Add 15.2 parts of salicylic acid to 500 parts water. Stir the mixture for an hour. Add caustic soda (approximately 0.11 mole part) until the solid particles are completely dissolved leaving the solution of such alkalinity that it will give a red or orange coloration when applied to brilliant yellow paper. Add 200 parts of 10% soda ash solution, and stir until it is dissolved (approximately 20 minutes). Adjust the temperature to 20° C., if necessary. Slowly add the tetrazo of di-(p-aminobenzoyl)-ethylene-diamine to the rapidly agitated solution of salicylic acid during approximately one-half hour. Stir 4 hours allowing the temperature of the mass to rise to 20 to 25° C. Slowly heat the mixture to 75° C. over a period of one hour. Add approximately 195 parts of salt (15% by volume) and stir one-half hour. The dye should show practically no bleed out when spotted on filter paper. Filter and dry the wet press cake in an oven at 80 to 90° C. The dried powder is yellow in appearance. It dissolves in water giving a yellow solution.

The probable formula of the dye is:

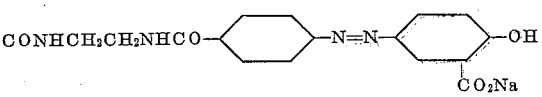

The compound thus produced dyes wool from an acid bath in yellow shades. When chromed on the fiber, in the usual manner, it produces a yellow shade of good fastness qualities.

Example III

Tetrazotize 14.9 parts of di-(p-aminobenzoyl)-ethylene-diamine per directions given under Example I.

Stir 15 parts of cresidine with 250 parts of water at 65 C. Add 11 parts of 32% hydrochloric acid solution. The cresidine should dissolve to a solution slightly acid to Congo red paper. Cool the solution to 30° C. Add the solution of cresidine to the tetrazo solution of di-(p-aminobenzoyl)-ethylene-diamine during approximately five minutes. Immediately add 22 parts of sodium acetate. Maintain a neutral acidity on Congo red paper and an excess of cresidine. Stir 12 hours. Slowly warm the reaction mixture to 60° C. Filter and dry the wet press cake at 80 to 90° C. The dry powder is yellow in appearance, and quite insoluble in water. It dissolves in alcohol, giving a yellow solution.

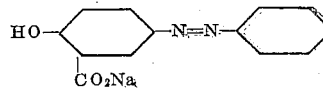

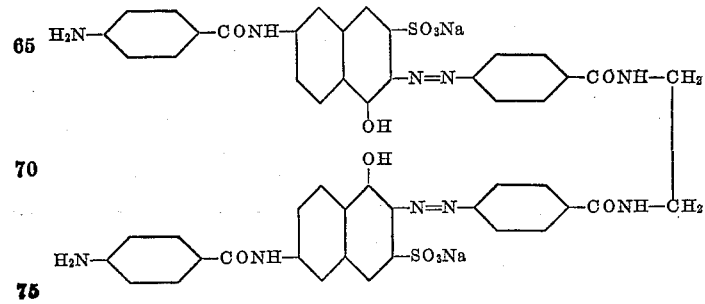

Its probable formula is:

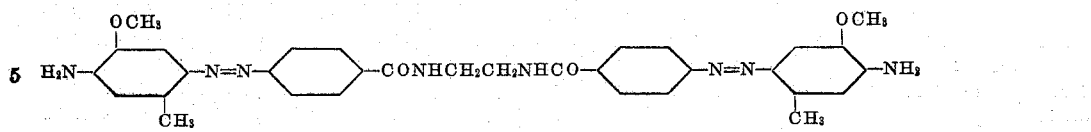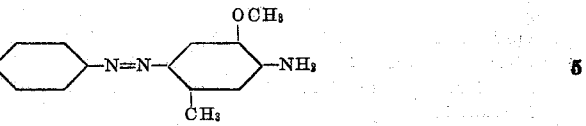

The product thus produced dyes cellulose acetate material to a yellow shade of good fastness qualities.

Example IV

Tetrazotize 14.9 parts of di-(p-aminobenzoyl)-ethylene-diamine per directions in Example I listed above. Cool the tetrazo to 0° C.

Add 17.9 parts of p-aminobenzoyl-J-acid to 200 parts of water. Stir the mixture for approximately one hour. Slowly add ammonia (approximately 4 parts of 27% solution) until the solid material is completely dissolved leaving the solution only very slightly alkaline as shown by its giving an orange-red color when spotted on brilliant yellow paper. Add 18 parts of soda ash, stir until it is dissolved (approximately 20 minutes), and cool to 0° C.

Add the solution of p-aminobenzoyl-J-acid very rapidly to the tetrazo solution above prepared. Add soda ash, as necessary to maintain distinct alkalinity on brilliant yellow paper (approximately 1 or 2 parts). As soon as the test for tetrazo is negative as shown by getting no color reaction when an alkaline H-acid solution is streaked across a rim of the solution mass on "spot" paper, immediately add the entire mass to the following alkaline solution of 1-meta-amino-phenyl-5-pyrazolone-3-carboxylic acid, keeping the temperature at 0° C.

Stir 24 parts of 1-meta-amino-phenyl-5-pyrazolone-3-carboxylic acid with 300 parts of water. Add approximately 7 parts of soda ash, until the solid material is completely dissolved to a clear solution, which shows an orange red color when spotted on brilliant yellow paper. Add 10 parts of soda ash and cool the solution to 0° C.

Stir for 4 hours after adding the above diazo to the solution of 1-meta-amino-phenyl-5-pyrazolone-3-carboxylic acid, allowing the temperature to rise and maintaining an excess of coupling component. Add more soda ash, if necessary, in order to maintain an immediate red color when the reaction mass is spotted in brilliant yellow paper. Warm slowly the mass to 75° C., and add approximately 170 parts of salt (10% by volume). Filter and dry the press cake in an oven at 75 to 100° C. The dried product is reddish-orange in appearance, and dissolves in water to give a yellow-orange solution. The probable structure of the dye is smooth slurry is obtained (approximately 1 hour).

Add ice to lower the temperature to 10° C., and then 19 parts of sodium nitrite as a 2-normal solution as rapidly as possible. Continue the diazotization for one hour, maintaining an excess of nitrite as shown by a spot turning potassium iodide starch paper blue.

To a slurry of 80 parts of H-acid in 1000 parts of water, add 10 parts (.025 mole) of sodium hydroxide as a 2-normal solution leaving the solution slightly acid to litmus paper. Cool the solution to 0° C. before coupling by adding ice as necessary.

The solution of H-acid was run slowly (over approximately one-half hour) into the para-nitraniline diazo prepared above. The combination was stirred overnight. Next morning the solution was made slightly alkaline to brilliant yellow paper by addition of 74 parts of sodium carbonate.

75 parts of di(para-amino-benzoyl) ethylene diamine was dissolved in 2000 parts of water by the use of 46 parts of hydrochloric acid. The solution was iced to 10° C. and 35 parts of sodium nitrite as 2-normal solution was added as rapidly as absorbed (approximately 5 minutes). A slight excess nitrite was maintained for 15 minutes.

A solution of salicylic acid was prepared by stirring 35 parts of the acid with 200 parts of water. Caustic soda (approximately 10 parts) was added until the salicylic acid was completely dissolved, leaving the solution slightly alkaline to brilliant yellow paper. 80 parts of sodium carbonate was added to the solution and enough ice to lower the temperature to 10° C.

The alkaline solution of salicylic acid was run into the solution of the tetrazo prepared as above as rapidly as possible (approximately 2 minutes). The coupling was balanced to slight excess of salicylic acid as indicated by testing with ferric chloride. Streaking the solution across a spot of ferric chloride solution caused the latter to turn dark. Stirring was continued for 1 hour.

The alkaline solution of the para-nitraniline $$\xrightarrow{\text{acid}}$$

H-acid coupling was next run into the above salicylic acid←benzidine diazo. Stirring was continued for 4 hours keeping the solution alkaline, as shown by a spot of it turning brilliant yellow

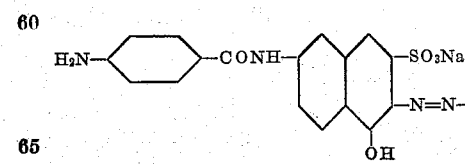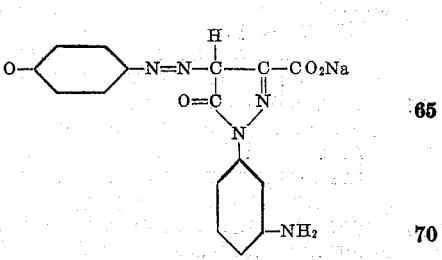

Example V

Stir 37 parts of p-nitraniline with 2000 parts of water and 26 parts of hydrochloric acid until a paper a red color. More soda ash is added, if necessary, to maintain the desired alkalinity.

The solution was heated slowly to 65 to 70° and 600 parts of sodium chloride (approximately 5% by weight) was added. The dye precipitated on ½ hour stirring. The dye was filtered off and dried in an oven. It is soluble in water, giving a green solution which dyes cotton bluish green shades of good fastness to washing. Its probable formula is

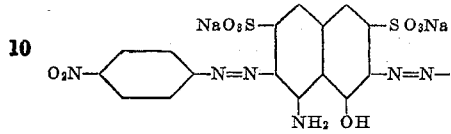

Example VI

The dye p-nitraniline $\xrightarrow{acid}$ H-acid←benzidine→phenol was prepared by the above procedure by the substitution of phenol for salicylic acid. A green dye was obtained, which had good affinity for cotton or regenerated cellulose.

Example VII

Slurry 14.9 parts of di-(m-amino-benzoyl)-ethylene diamine with 400 parts of water. Add 25 parts of 32% aqueous hydrochloric acid. Stir until completely dissolved and cool to 10° C. Add 7 parts of sodium nitrite as 30% solution as rapidly as absorbed. Keep a slight excess of nitrite by slight addition if necessary, for 20 minutes at 10 to 12° C., as shown by a spot of the solution giving a blue spot on potassium iodide starch paper.

Slurry 25 parts of J-acid with 600 parts of water. Add 11 parts of soda ash and stir until the J-acid is completely dissolved. Add 32 parts of soda ash just before coupling, and cool to 0° C. by the addition of ice. Slowly (approximately 15 minutes) add the tetrazo solution prepared above to the J-acid solution maintaining good agitation. Maintain distinct alkalinity on brilliant yellow paper and an excess of J-acid by the respective addition of soda ash or J-acid as necessary. Stir 1 hour. Slowly warm the dye to 75° C. and add approximately 180 parts of salt (10% by volume). Stir 20 minutes. Filter the salted dye and re-slurry the press cake with 600 parts of water. Stir until smooth slurry is obtained. Add 30 parts of 32% aqueous hydrochloric acid and adjust temperature to 15° C. by the addition of ice. Add 7 parts of sodium nitrite as 30% solution and stir 1½ hours, maintaining an excess of nitrite by subsequent additions if necessary, as shown by its giving a blue spot when streaked on potassium iodide starch paper, and acidity such that it gives a blue spot on Congo red paper by further addition of hydrochloric acid, if necessary.

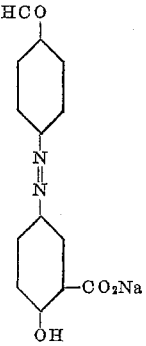

Slurry 31.5 parts of phenyl J-acid with 600 parts of water. Add 40 parts of soda ash and stir until the phenyl J-acid is dissolved. Adjust the temperature to 15° C. by adding ice and slowly run in the tetrazo prepared above, maintaining strong soda ash alkalinity as shown by spotting on brilliant yellow paper by subsequent addition of soda ash if necessary. Keep an excess of phenyl J-acid, by the addition of small amounts, if necessary. Stir 2 hours. Slowly warm the tetrakisazo dye to 75° C. and add approximately 200 parts of salt (10% by volume). Filter the salted dye and dry the press cake in an oven at 80 to 90° C. The probable structural formula of the product is:

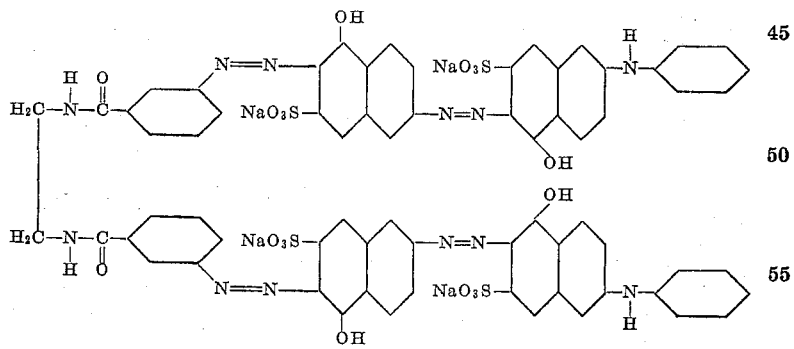

It dissolves in water to give a bordeaux solution, which has good affinity for cotton or regenerated cellulose.

Example VIII

The two dyes (di-m-amino-benzoyl-ethylene-diamine) ⇉ (J-acid)₂ ⇉ (1-phenyl-3-methyl-5-pyrazolone)₂, a red orange color, and (di-m-amino-benzoyl-ethylene-diamine) ⇉ (1:6-Cleve's acid)₂ ⇉ (gamma acid)₂ a brown dyestuff, prepared in a manner analogous to the above product, showed similar dyeing properties.

In a similar manner other disazo dyes may be prepared, using the diamino intermediates of the general formula hereinabove set forth. Trisazo and tetrakisazo dyes may likewise be prepared, following in general the mode of procedure normally used in the art for synthesis of analogous dyes from diamino compounds.

The following is a list of some of the dyes actually prepared by us, together with the colors produced by them on the fibers respectively indicated, as well as the color obtained by development on the fiber, where feasible, with beta naphthol. In this table, the symbol PAB stands for the words paraaminobenzoyl, and the symbol MAB for metaaminobenzoyl.

are hydroxy or amino derivatives of benzene, naphthalene and other aryl nuclei. Among other types of products, that can be used as coupling agents, are the following: acetacetoarylides, pyrazolones, amino and hydroxy derivatives of quinoline.

The two coupling components, usually used per mole of diazo component, may consist of like or unlike intermediates. The latter need not necessarily be used in equi-molecular proportions.

*Dyes especially useful for cotton or regenerated cellulose*

| Tetrazo of— | Coupled to two moles of— | Direct shade | Shade when diazotized on the fiber and developed with beta naphthol |
|---|---|---|---|
| Di(PAB)-deca-methylene diamine | 2-amino-5-naphthol-7-sulfonic acid; (J-acid) | Red | Bordeaux. |
| Do | 1-meta-amino-phenyl-5-pyrazolone-3-carboxylic acid | Yellow | Orange. |
| Do | (PAB)-J-acid | Orange | Do. |
| Do | (MAB)-J-acid | do | Do. |
| Do | 1-8-amino-hydroxy-naphthalene-3-6-disulfonic acid; (H-acid). | Pink | |
| Do | (MAB)-H-acid | Red | Red. |
| Di(MAB)-decamethylene diamine | (PAB)-J-acid | Orange | Orange. |
| Do | 1-meta-amino-phenyl-5-pyrazolone-3-carboxylic acid | Yellow | Do. |
| Di(PAB)-ethylene diamine | J-acid | Red | Bordeaux. |
| Do | (MAB)-J-acid | Orange | Orange. |
| Do | (PAB)-J-acid | do | Do. |
| Do | 1-meta-amino-phenyl-5-pyrazolone-3-carboxylic acid | Yellow | Do. |
| Do | One mole of PAB J-acid / One mole of 1-meta-amino-phenyl-5-pyrazolone-3-carboxylic acid. | Orange | Red brown. |
| Do | One mole of salicylic acid / One mole of gamma acid | Brown | |
| Do | Di(PAB)-3:5-diamino benzoyl-J-acid | Orange | Orange. |
| Di(MAB)-ethylene diamine | J-acid | Red | Bordeaux. |
| Do | (MAB)-J-acid | Orange | Orange. |
| Do | (PAB)-J-acid | do | Do. |
| Do | 1-meta-amino-phenyl-5-pyrazolone-3-carboxylic acid | Yellow | Do. |
| Di(PAB)-cyclohexyl-diamine | J-acid | Red | Bordeaux. |
| Do | (PAB)-J-acid | Orange | Orange. |
| Do | 1-meta-amino-phenyl-5-pyrazolone-3-carboxylic acid | Yellow | Do. |
| Do | (MAB)-J-acid | Orange | Do. |

*Wool dyes*

| Tetrazo of— | Coupled to two moles of— | Shade |
|---|---|---|
| Di(PAB)decamethylene diamine | 1-(2-5-dichlor-4-sulfophenyl)-3-methyl-5-pyrazolone | Yellow. |
| Di(MAB)decamethylene diamine | do | Do. |
| Di(PAB)ethylene diamine | 1-(2-5-dichlor-4-sulfophenyl)-3-methyl pyrazolone | Do. |
| Do | 1-acetyl-amino-8-hydroxy naphthalene-3-6-disulfonic acid | Orange. |
| Do | H-acid | Violet. |
| Do | Salicylic acid | Yellow-direct. Yellow when chromed on the fiber. |
| Do | One mole phenyl gamma acid / One mole salicylic acid | Brown. |
| Do | 1-8-dihydroxy-naphthalene-3:6-disulfonic acid | Orange. |

*Dyes which have affinity for cellulose acetate*

| Tetrazo of— | Coupled to two moles of— | Shade on cellulose acetate |
|---|---|---|
| Di(PAB)ethylene diamine | 1-amino-2-methoxy-5-methyl benzene | Yellow. |
| Do | 1-phenyl-3-methyl-5-pyrazolone | Do. |
| Do | Meta toluidine | Do. |
| Do | Resorcinol | Do. |

Other dyes than those mentioned in the above table may likewise be prepared, using the tetrazo compounds of the above mentioned diamines of the general formula

H₂N—R—CONH—Alk—NHCO—R—NH₂

(wherein R and Alk have the same significance as above set forth), and coupling the same to any compound capable of coupling with diazo derivatives. The NH₂ groups must be meta or para to the CONH groups on the divalent aryl radicals, R; since if they are in the ortho position, the compound will undergo ring closure instead of coupling. Most of such compounds Other substituent groups, such as halogen, alkyl, alkoxy, aryl, aralkyl, substituted amino, azo, carboxy, carbonyl and sulfonic acid may be present as substituent groups on the coupling component, as long as they do not block the coupling.

The products of this invention include water insoluble products, some of which may be utilized as pigments, as spirit soluble or oil soluble dyes or, preferably in dispersed form, as acetate silk dyes. The more valuable products are water soluble, and may be used as dyes for cotton, regenerated cellulose, wool, silk, leather and other substances of vegetable, animal or synthetic origin. The most desirable ones, are used for the direct and developed dyeing of cotton. The developed dyeings, using beta naphthol as the developing agent, have outstanding fastness to washing. Chromed wool dyeings of excellent properties have also been made.

The following additional examples illustrate the application of my novel dyestuffs to the various fibers, such as cotton, wool or cellulose acetate. The first of these illustrates further the development of the dye on the fiber.

*Example IX—Dyeing of cotton*

Five parts of cotton piece goods is dyed by immersion into a solution of ten-hundredths parts of the disazo dye obtained by coupling tetrazotized di(p-aminobenzoyl)-ethylene-diamine into two molecules of p-aminobenzoyl-J-acid, in approximately 500 cc. of water. The solution is maintained at 180 to 212° F. for ½ hour; salt being slowly added to exhaust the dyestuff. The dyed fabric is rinsed in cold water and put in 200 parts of water at 20° C. Add three-tenths parts of sodium nitrite and four-tenths parts of sulfuric acid. Stir 15 minutes. Rinse with cold water. Dissolve one-tenth part of beta-naphthol in 200 parts water and one-twentieth part of caustic soda. Stir the solution rapidly while adding the above rinsed piece goods. Stir 15 minutes. Rinse in cold water and dry. The dyeing is a bright orange shade of outstanding fastness to washing.

*Example X—Dyeing of wool*

Dissolve one tenth part of dyestuff, phenyl-gamma acid←di (PAB)ethylene-diamine→salicylic acid, in 25 parts of water at 160 to 170° F. Add 5 parts of 10% solution of Glauber's salt, followed by 1½ parts of 10% acetic acid solution. Heat to 160 to 170° F. Add 5 parts of wool material or skein. Heat the solution to the boiling point of the water and maintain this temperature for ½ hour, adding water as necessary to keep it equal to the original volume. Add 1½ parts more of 10% acetic acid solution, and keep the dyebath at the boil for 15 minutes longer, adding water as necessary to keep the original concentration. Remove the wool goods, rinse in cold water, and dry in an oven at 80 to 100° C. The dyed fabric is a nice brown shade with excellent fastness to fulling.

*Example XI—Dyeing of cellulose acetate*

Add 0.10 part of the dyestuff, cresidine←di (PAB) ethylene diamine→cresidine, to 1 part of 10% olive oil soap solution and paste the slurry until thoroughly mixed. Slowly add while constantly stirring, 200 parts of warm water at 130° to 140° F. Put in 5 parts of "Acele", either as skein or piece goods. Stir at regular intervals during 40 minutes, keeping the temperature at 160 to 170° F. Remove the "Acele" from the solution, rinse in cold water, and dry in an oven at 90 to 100° C. The dyed fabric is orange in shade.

I claim:

1. A disazo dye having the general formula

R₁—N=N—R—CONH—Alk—
NHCO—R—N=N—R₂ wherein Alk designates the bivalent residue of a saturated hydrocarbon having from 2 to 18 carbon atoms in its structure, R is divalent radical of the benzene series, the —N=N— groups are meta or para to the CONH groups, and R₁ and R₂ designate azo dye coupling components.

2. A disazo dye having the general formula

R₁—N=N—C₆H₄—CONH—Alk—
NHCO—C₆H₄—N=N—R₂ wherein Alk designates the bivalent residue of a saturated hydrocarbon having from 2 to 18 carbon atoms in its structure, the —N=N— groups are meta or para to the CONH groups, and R₁ and R₂ designate azo dye coupling components.

3. A disazo dye having the general formula

R₁—N=N—C₆H₄—CONH—Alk—
NHCO—C₆H₄—N=N—R₁ wherein Alk designates the bivalent residue of a saturated hydrocarbon having from 2 to 18 carbon atoms in its structure, the —N=N— groups are meta or para to the CONH groups, and R₁ designates an azo dye coupling component containing a water-solubilizing radical.

4. A disazo dye having the general formula

R₁—N=N—C₆H₄—CONH—Alk—
NHCO—C₆H₄—N=N—R₁ wherein Alk designates the bivalent residue of a saturated hydrocarbon having from 2 to 18 carbon atoms in its structure, the —N=N— groups are meta or para to the CONH groups, and R₁ designates an azo dye coupling component containing a water-solubilizing radical and containing further a diazotizable amino group.

5. A disazo dye having the following general formula:

R₁—N=N—C₆H₄—CONH—Alk—
NHCO—C₆H₄—N=N—R₁, wherein Alk designates the bivalent residue of a saturated hydrocarbon having from 2 to 18 carbon atoms in its structure, the —N=N— groups are meta or para to the CONH groups, and R₁ designates an azo dye coupling component containing a sulfo water-solubilizing radical.

6. A disazo dye having the following formula

R₁—N=N—C₆H₄—CONH—Alk—
NHCO—C₆H₄—N=N—R₁, wherein Alk designates the bivalent residue of a saturated hydrocarbon having from 2 to 18 carbon atoms in its structure, the —N=N— groups are meta or para to the CONH groups, and R₁ designates an azo dye coupling component containing a carboxy water-solubilizing radical.

7. A disazo dye having the following general formula:

R₁—N=N—C₆H₄—CONH—Alk—
NHCO—C₆H₄—N=N—R₁, wherein Alk designates the bivalent residue of a saturated hydrocarbon having from 2 to 18 carbon atoms in its structure, the —N=N— groups are meta or para to the CONH groups, and R₁ designates an azo dye coupling component free from water-solubilizing groups.

8. A disazo dye having the general formula

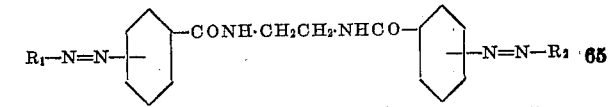

wherein R₁ and R₂ designate azo dye coupling components, and the —N=N— groups are meta or para to the CONH groups.

9. A disazo dye having the general formula

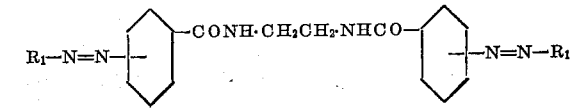

wherein $R_1$ designates an azo dye coupling component containing a water-solubilizing radical, and the —N=N— groups are meta or para to the CONH groups.

10. A disazo dye having the general formula

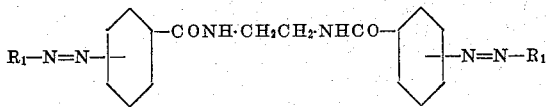

wherein $R_1$ designates an azo dye coupling component containing a water-solubilizing radical and containing further a diazotizable amino group, and the —N=N— groups are meta or para to the CONH groups.

11. A disazo dye having the general formula

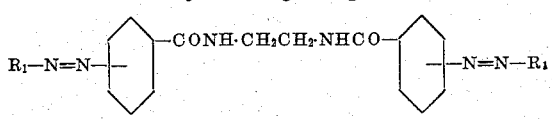

wherein $R_1$ designates an azo dye coupling component free from water-solubilizing groups, and the —N=N— groups are meta or para to the CONH groups.

12. A disazo dye having the general formula

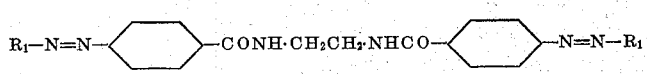

wherein $R_1$ designates the radical of an aminobenzoyl-J-acid.

13. A disazo dye having the general formula

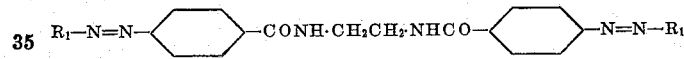

wherein $R_1$ designates the radical of sodium salicylate.

14. A disazo dye having the general formula

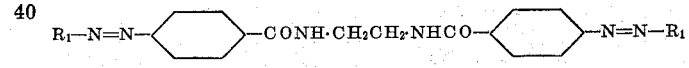

wherein $R_1$ designates the radical of resorcinol.

15. The process of producing a polyazo dye, which comprises tetrazotizing a diamino compound of the general formula

H$_2$N—R—CONH—Alk—NHCO—R—NH$_2$, wherein Alk stands for the bivalent residue of a saturated hydrocarbon having from 2 to 18 carbon atoms, while R is a divalent aryl radical of the benzene series, the NH$_2$ groups being meta or para to the CONH groups, and coupling the tetrazo compound thus produced to azo dye coupling components.

16. The process of producing a disazo dye, which comprises tetrazotizing a diamino compound of the general formula

H$_2$N—C$_6$H$_4$—CONH—Alk—NHCO—C$_6$H$_4$—NH$_2$, wherein Alk designates the bivalent residue of a saturated hydrocarbon having from 2 to 18 carbon atoms in its structure, the NH$_2$ groups being meta or para to the CONH groups, and coupling the tetrazo compound thus produced to two molecules of an azo dye coupling component.

17. The process of producing a disazo dye, which comprises tetrazotizing a diamino compound of the general formula

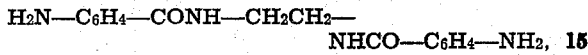

H$_2$N—C$_6$H$_4$—CONH—CH$_2$CH$_2$—
  NHCO—C$_6$H$_4$—NH$_2$, the NH$_2$ groups being meta or para to the CONH groups, and coupling the tetrazo compound thus produced to two molecules of an azo dye coupling component containing a water-solubilizing radical.

18. The process of producing a disazo dye, which comprises tetrazotizing a diamino compound of the general formula

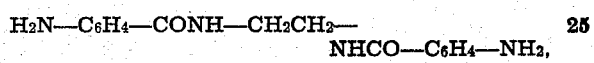

H$_2$N—C$_6$H$_4$—CONH—CH$_2$CH$_2$—
  NHCO—C$_6$H$_4$—NH$_2$, the NH$_2$ groups being meta or para to the CONH groups, and coupling the tetrazo compound thus produced to two molecules of an azo dye coupling component containing a water-solubilizing radical and containing further a diazotizable amino group.

19. The process of producing a disazo dye, which comprises tetrazotizing a diamino compound of the general formula

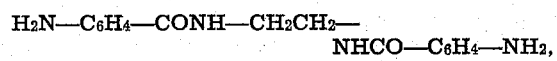

H$_2$N—C$_6$H$_4$—CONH—CH$_2$CH$_2$—
  NHCO—C$_6$H$_4$—NH$_2$, the NH$_2$ groups being meta or para to the CONH groups, and coupling the tetrazo compound thus produced to two molecules of an azo dye coupling component free from water-solubilizing groups.

SWANIE SIGUARD ROSSANDER.